US012056929B2

(12) United States Patent
Bohl et al.

(10) Patent No.: US 12,056,929 B2
(45) Date of Patent: Aug. 6, 2024

(54) AUTOMATIC GENERATION OF EVENTS USING A MACHINE-LEARNING MODEL

(71) Applicant: Google LLC, Mountain View, CA (US)

(72) Inventors: Kristina Bohl, Boulder, CO (US); Joe Agajanian, Los Angeles, CA (US); Lily Berg, Los Angeles, CA (US); Brian Potetz, Irvine, CA (US); Keegan Mosley, Los Angeles, CA (US); Shinko Cheng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 423 days.

(21) Appl. No.: 17/404,773

(22) Filed: Aug. 17, 2021

(65) Prior Publication Data
US 2022/0366191 A1    Nov. 17, 2022

Related U.S. Application Data

(60) Provisional application No. 63/189,657, filed on May 17, 2021, provisional application No. 63/187,392, filed on May 11, 2021.

(51) Int. Cl.
*G06V 20/40* (2022.01)
*G06F 18/21* (2023.01)
(Continued)

(52) U.S. Cl.
CPC .......... *G06V 20/44* (2022.01); *G06F 18/2148* (2023.01); *G06F 18/2178* (2023.01);
(Continued)

(58) Field of Classification Search
CPC ............. G06V 20/35–49; G06V 20/30; G06V 40/166; G06V 20/44; G06F 18/2148;
(Continued)

(56) References Cited

U.S. PATENT DOCUMENTS 6,608,633 B1 * 8/2003 Sciammarella ........ H04N 5/445
                                                          348/E5.103
2005/0165726 A1 * 7/2005 Kawell, Jr. ............... H04L 9/40
(Continued)

FOREIGN PATENT DOCUMENTS

WO    2015/191132    12/2015

OTHER PUBLICATIONS

WIPO, International Search Report for International Patent Application No. PCT/US2021/063111, Mar. 22, 2022, 4 pages.
(Continued)

*Primary Examiner* — Casey L Kretzer
(74) *Attorney, Agent, or Firm* — IP Spring

(57) ABSTRACT

A media application segments a library of media associated with a user account into episodes, wherein each episode is associated with a corresponding time period. The media application generates, using an event machine-learning model, an event signal that indicates a likelihood that an event occurred in each episode, wherein the event machine-learning model is a classifier that receives the media as input. The media application generates an event significance score for each episode. The media application determines one or more events from the episodes based on the event signal and a corresponding event significance score exceeding a threshold event significance value. The media application provides a user interface that includes corresponding media from the one or more events.

20 Claims, 10 Drawing Sheets

(51) Int. Cl.
*G06F 18/214* (2023.01)
*G06F 18/23* (2023.01)
*G06T 11/60* (2006.01)
*G06V 20/30* (2022.01)
*G06V 40/16* (2022.01)

(52) U.S. Cl.
CPC .......... *G06F 18/2193* (2023.01); *G06F 18/23* (2023.01); *G06T 11/60* (2013.01); *G06V 20/30* (2022.01); *G06V 20/49* (2022.01); *G06V 40/166* (2022.01); *G06T 2200/24* (2013.01)

(58) Field of Classification Search
CPC .. G06F 18/2178; G06F 18/2193; G06F 18/23; G06T 11/60; G06T 2200/24
See application file for complete search history.

(56) References Cited

U.S. PATENT DOCUMENTS

| | | | |
|---|---|---|---|
| 2010/0114891 A1* | 5/2010 | Oami | G06F 16/51 707/752 |
| 2012/0039546 A1* | 2/2012 | Berger | G06V 40/172 382/305 |
| 2015/0293928 A1* | 10/2015 | Chen | G06F 16/738 707/738 |
| 2017/0075927 A1* | 3/2017 | Duggal | G06F 16/5866 |
| 2018/0082455 A1* | 3/2018 | Yamaji | G06V 20/35 |
| 2019/0220483 A1 | 7/2019 | Li et al. | |
| 2021/0103611 A1 | 4/2021 | Kumar et al. | |
| 2021/0382850 A1* | 12/2021 | He | G06F 3/04886 |

OTHER PUBLICATIONS

WIPO, Written Opinion for International Patent Application No. PCT/US2021/063111, Mar. 22, 2022, 6 pages.

* cited by examiner

300

Valentine's Day

350

Day of Hearts

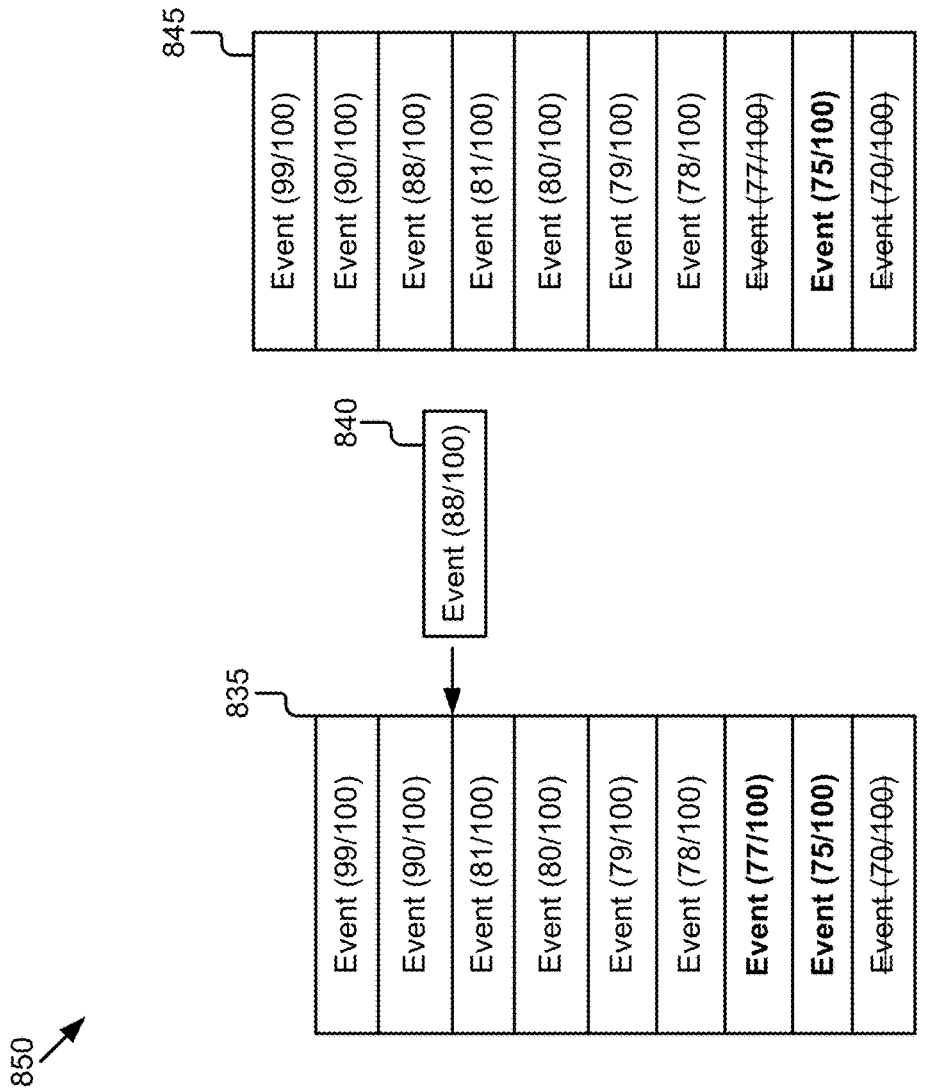

AUTOMATIC GENERATION OF EVENTS USING A MACHINE-LEARNING MODEL

CROSS-REFERENCE TO RELATED APPLICATIONS

The present application claims priority to U.S. Provisional Patent Application No. 63/187,392, filed May 11, 2021 and titled "Automatic Generation of Events Using a Machine-Learning Model," and U.S. Provisional Patent Application No. 63/189,657, filed May 17, 2021 and titled "Automatic Generation of Events Using a Machine-Learning Model," each of which is incorporated herein in its entirety.

BACKGROUND

Users of devices, such as smartphones or other digital cameras capture and store a large amount of media (e.g., photos and videos) in their libraries. Users access the libraries to view their media to reminisce about various events, such as birthdays, weddings, vacations, trips, etc. However, the libraries often have thousands of images taken over a long period of time that are difficult to organize.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method comprises: segmenting a library of media associated with a user account into episodes, wherein each episode is associated with a corresponding time period; generating, using an event machine-learning model, an event signal that indicates a likelihood that an event occurred in each episode, wherein the event machine-learning model is a classifier that receives the media as input; generating an event significance score for each episode; determining one or more events from the episodes based on the event signal and a corresponding event significance score exceeding a threshold event significance value; and providing a user interface that includes an event item with corresponding media from a particular event of the one or more events.

In some embodiments the user interface is part of a reverse-chronological grid of media that includes the corresponding media, and the method further comprises: responsive to a user selecting the event item from the reverse-chronological grid, replacing the reverse-chronological grid with a display of the corresponding media from the particular event for a predetermined time duration and responsive to completing the display of the corresponding media, displaying the reverse-chronological grid. In some embodiments, the event item is displayed with a size that is based on one or more of the event significance score, a number of media items for the particular event, a total number of events in a period of time, or an event type. In some embodiments, the method further includes receiving a request from a user to remove depictions of a person from the media in the library of media that include depictions of the person and filtering the depictions of the person from the media, wherein the filtering is performed before the event significance score is generated. In some embodiments, the user interface includes an option to hide or an option to add one or more of a media item from the one or more events, a date associated with the one or more events, or a person or pet depicted in media items from the one or more events. In some embodiments, the user interface includes an option to hide the event item. In some embodiments, generating the event significance score is based on one or more of at least a threshold number of media items in a corresponding episode, at least a threshold number of face clusters in the corresponding episode, a quality indicator of the media items in the corresponding episode, at least one face cluster of a threshold rank, or a presence of a rare face cluster. In some embodiments, the method further includes combining multiple episodes into a single event based on one or more of the multiple episodes being associate with respective time periods that all fall a 24-hour period, the single event being a type of event that occurs over multiple days, celebrations on different days that relate to the single event, the multiple episodes involving a same location, or the multiple episodes involving a same set of face clusters. In some embodiments, the method further includes generating a confidence score that indicates a likelihood that a corresponding event is a type of event that is accurately recognized and responsive to the confidence score meeting a threshold confidence value, adding an automatically generated title descriptive of the type of event to the corresponding event. In some embodiments, the method further includes, responsive to the confidence score failing to meet the threshold confidence value, adding the title to the corresponding event based on a template phrase. In some embodiments, a title machine-learning model receives the corresponding media from the one or more events as input and the title machine-learning model generates the title as output. In some embodiments, the user interface includes an option to edit the corresponding media from the particular event. In some embodiments, the method further includes: determining the one or more events comprises determining the events such that a number of the events is less than or equal to a predetermined number each month, receiving new media to associate with the library of media, and replacing the particular event of the one or more events with a new event, responsive to the new event being associated with a new event significance score that is higher than the event significance score for the particular event. In some embodiments, the user interface includes an option to change a title of the event item. In some embodiments, the method further includes generating audio for the corresponding media that is based on a type of the particular event.

Embodiments may further include a system comprising one or more processors and a memory that stores instructions executed by the one or more processors, the instructions comprising: segmenting a library of media associated with a user account into episodes, wherein each episode is associated with a corresponding time period; generating, using an event machine-learning model, an event signal that indicates a likelihood that an event occurred in each episode, wherein the event machine-learning model is a classifier that receives the media as input; generating an event significance score for each episode; determining one or more events from the episodes based on the event signal and a corresponding event significance score exceeding a threshold event significance value; and providing a user interface that includes an event item with corresponding media from a particular event of the one or more events.

In some embodiments, the user interface is part of a reverse-chronological grid of media that includes the corresponding media, and the method further comprises: responsive to a user selecting the event item from the reverse-chronological grid, replacing the reverse-chronological grid with a display of the corresponding media from the particular event for a predetermined time duration and responsive to completing the display of the corresponding media, displaying the reverse-chronological grid. In some embodiments, the event item is displayed with a size that is based on one or more of the event significance score, a number of media items for the particular event, a total number of events in a period of time, or an event type.

Embodiments may further include a non-transitory computer readable medium includes instructions stored thereon that, when executed by one or more computers, cause the one or more computers to perform operations comprising: segmenting a library of media associated with a user account into episodes, wherein each episode is associated with a corresponding time period; generating, using an event machine-learning model, an event signal that indicates a likelihood that an event occurred in each episode, wherein the event machine-learning model is a classifier that receives the media as input; generating an event significance score for each episode; determining one or more events from the episodes based on the event signal and a corresponding event significance score exceeding a threshold event significance value; and providing a user interface that includes an event item with corresponding media from a particular event of the one or more events.

In some embodiments, the user interface is part of a reverse-chronological grid of media that includes the corresponding media, and the method further comprises: responsive to a user selecting the event item from the reverse-chronological grid, replacing the reverse-chronological grid with a display of the corresponding media from the particular event for a predetermined time duration and responsive to completing the display of the corresponding media, displaying the reverse-chronological grid.

BRIEF DESCRIPTION OF THE DRAWINGS

FIGS. 8A-8B illustrate an example block diagram that shows different examples of reorganizing of different events based on changes, according to some embodiments.

DETAILED DESCRIPTION

Network Environment 100

Figure 1:
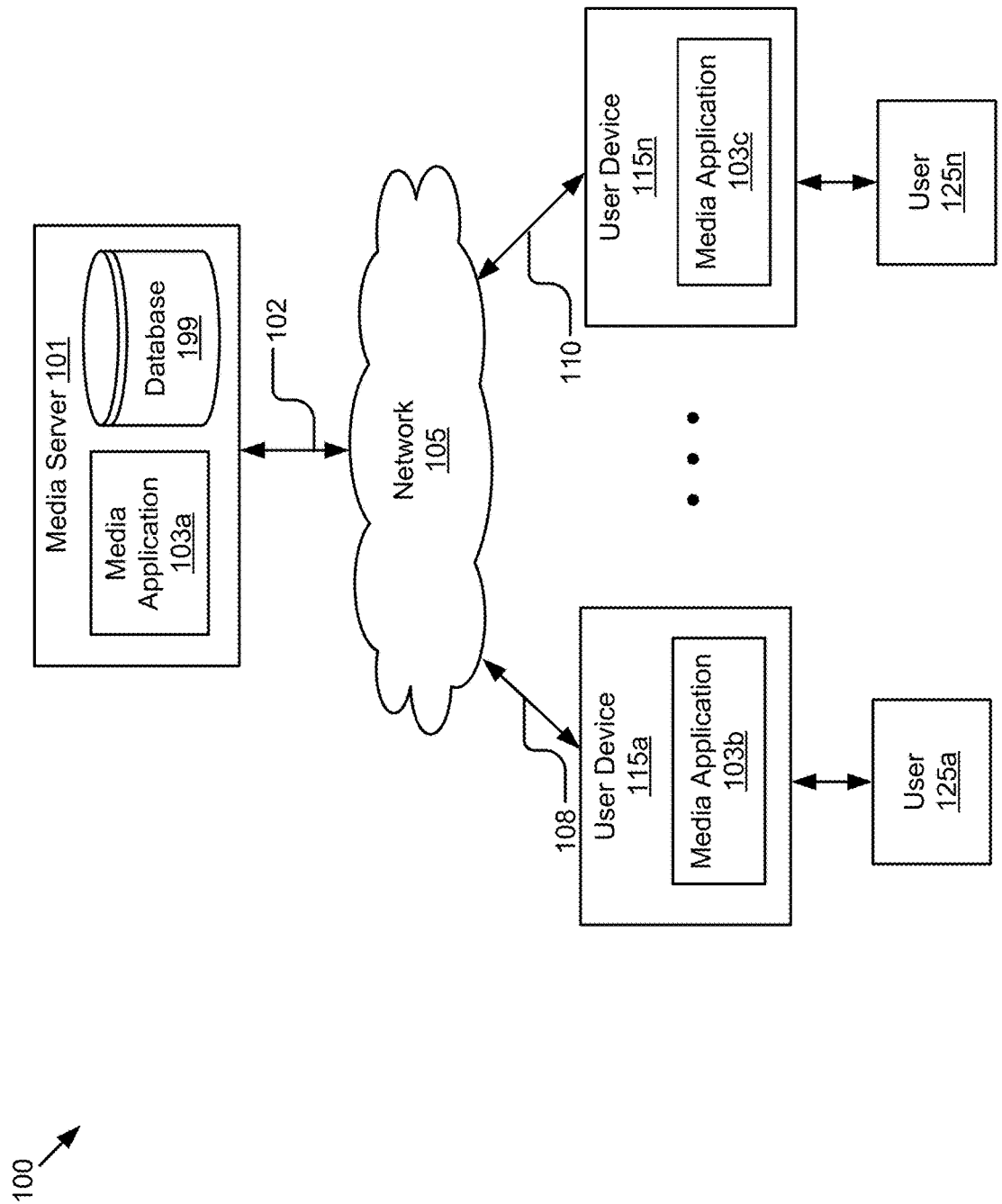
FIG. 1 is a block diagram of an example network environment, according to some embodiments described herein.

FIG. 1 illustrates a block diagram of an example environment 100. In some embodiments, the environment 100 includes a media server 101, a user device 115a, a user device 115n, and a network 105. Users 125a, 125n may be associated with respective user devices 115a, 115n. In some embodiments, the environment 100 may include other servers or devices not shown in FIG. 1 or the media server 101 may not be included. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The media server 101 may include a processor, a memory, and network communication hardware. In some embodiments, the media server 101 is a hardware server. The media server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the media server 101 sends and receives data to and from one or more of the user devices 115a, 115n via the network 105. The media server 101 may include a media application 103a and a database 199.

The media application 103a may include code and routines operable to receive a library of media associated with a user account. A media item as referred to herein can include an image or a video. An image can include a digital image having pixels with one or more pixel values (e.g., color values, brightness values, etc.). An image can be a static image (e.g., still photos, images with a single frame, etc.), or a motion image (e.g., an image that includes a plurality of frames, such as animations, animated GIFs, cinemagraphs where a portion of the image includes motion while other portions are static, etc.). A video as referred to herein, includes a plurality of frames, with or without audio. In some implementations, one or more camera settings, e.g., zoom level, aperture, etc. may be modified during capture of the video. In some implementations, the client device that captures the video may be moved during capture of the video. Text, as referred to herein, can include alphanumeric characters, emojis, symbols, or other characters.

The media application 103a may include codes and routines operable to segment the library of media into episodes. The media application 103a may generate, using an event machine-learning model, an event signal that indicates a likelihood that an event occurred in each episode. The media application 103a may generate an event significance score for each episode and determine one or more events from the episodes based on the event signal and a corresponding event significance score exceeding a threshold event significance value. The media application 103a may cause a user interface to display an event item with corresponding media from a library associated with a user account.

In some embodiments, the media application 103a may be implemented using hardware including a central processing unit (CPU), a field-programmable gate array (FPGA), an application-specific integrated circuit (ASIC), any other type of processor, or a combination thereof. In some embodiments, the media application 103a may be implemented using a combination of hardware and software.

The database 199 may store a library of media, training sets for a machine-learning model, user actions associated with the media (viewing, sharing, commenting, etc.). The database 199 may store media items that are indexed and associated with identities of the users 125 of the user devices 115. The database 199 may also store social network data associated with users 125, user preferences for the users 125, etc.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. The media application 103 may be stored as media application 103b on the user device 115a or media application 103c on the user device 115n. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the media application 103 receives a library of media associated with a user. For example, a user captures images and video from their camera (e.g., smartphone or other camera), uploads images from a digital single lens reflex (DSLR) camera, adds media captured by another user that is shared with them to their library of media items, etc. The media application 103 segments the library of media into episodes, where each episode is associated with a corresponding time period. For example, media associated with trick or treating may be considered an event because the media are associated with a several-hour time period and the location is a single neighborhood or town. Many episodes may include the types of media that a user would not repeatedly engage with. For example, a day at home where the user takes pictures of various broken things in order to buy replacement parts at the hardware store.

The media application 103 may include a trained machine-learning model, such as an event machine-learning model that receives the media as input and that generates an event signal that indicates a likelihood that an event occurred in each episode. For example, images that were taken during a 24-hour period in different locations without a similar theme may be associated with an event signal that indicates a low likelihood that an event occurred. Conversely, images that were taken during a 24-hour period in the same location, such as a picture of cake, a video of kids singing "happy birthday," and a room full of balloons may be associated with an event signal that indicates a high likelihood that an event (e.g., "birthday party") occurred.

The media application 103 may generate an event significance score for each episode. The media application 103 may use a machine-learning model for this step or a different type of module. The event significance score may be associated with a likelihood that the user would like to engage with the media in the episode. For example, the media application 103 may determine that an episode corresponds to an event that a user may want to view, share, send for the media to be printed in a photo album, etc. if the event significance score exceeds a threshold event significance value. In some embodiments, the event significance score is based on one or more of at least a threshold number of media items in a corresponding episode, at least a threshold number of face clusters in the corresponding episode, a quality indicator of the media items in the corresponding episode, at least one face cluster of a threshold rank, or a presence of a rare face cluster.

In some embodiments, the media application 103 determines an event from an episode based on both the event signal output by the event machine-learning model and a corresponding event significance score exceeding a threshold event significance value. In some embodiments, the default for an event is 24 hours, but event may also be combined if they appear to be connected in certain ways, such as an event that occurs over multiple days.

In some embodiments, the media application 103 provides a user interface that includes corresponding media from the events. The user interface may be part of a reverse-chronological grid of media that includes the corresponding media. For example, a user interface may include a "month carousel" of media corresponding to events that occurred during the month of February where the media is organized in a grid. In some embodiments, the user interface limits the number of events that are displayed in the grid according to a predetermined number. For example, the user interface may only include seven events in a particular month. If there are already seven events that are displayed in the user interface and new media is associated with a new event that has a new event significance score that is higher than a corresponding event significant score for the other seven events, the user interface may replace the previously displayed event with the new event.

Computing Device 200

Figure 2:
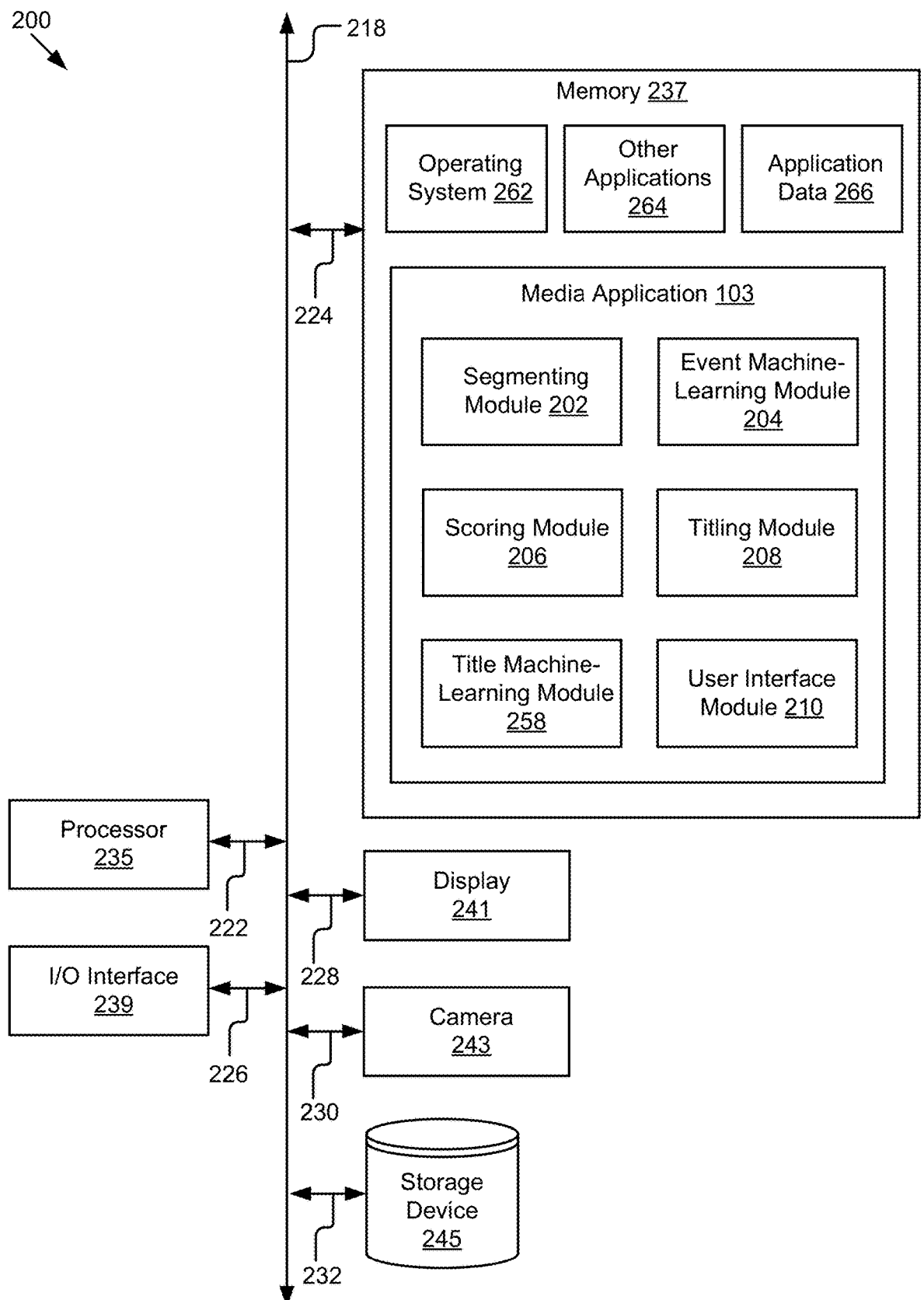
FIG. 2 is a block diagram of an example computing device, according to some embodiments described herein.

FIG. 2A is a block diagram of an example computing device 200 that may be used to implement one or more features described herein. Computing device 200 can be any suitable computer system, server, or other electronic or hardware device. In one example, computing device 200 is a user device 115 used to implement the media application 103. In another example, computing device 200 is the media server 101. In yet another example, the media application 103 is in part on the user device 115 and in part on the media server 101.

One or more methods described herein can be run in a standalone program that can be executed on any type of computing device, a program run on a web browser, a mobile application ("app") run on a mobile computing device (e.g., cell phone, smart phone, smart display, tablet computer, wearable device (wristwatch, armband, jewelry, headwear, virtual reality goggles or glasses, augmented reality goggles or glasses, head mounted display, etc.), laptop computer, etc.). In the primary example, all computations are performed within the mobile application (and/or other applications 264) on the mobile computing device. However, it is also possible to use a client/server architecture, e.g., a mobile computing device sends user input data to a server device and receives from the server the final output data for output (e.g., for display). In another example, computations can be split between the mobile computing device and one or more server devices.

In some embodiments, computing device 200 includes a processor 235, a memory 237, a I/O interface 239, a display 241, a camera 243, and a storage device 245. The processor 235 may be coupled to a bus 218 via signal line 222, the memory 237 may be coupled to the bus 218 via signal line 224, the I/O interface 239 may be coupled to the bus 218 via signal line 226, the display 241 may be coupled to the bus 218 via signal line 228, the camera 243 may be coupled to the bus 218 via signal line 230, and the storage device 245 may be coupled to the bus 218 via signal line 232.

Processor 235 can be one or more processors and/or processing circuits to execute program code and control basic operations of the computing device 200. A "processor" includes any suitable hardware system, mechanism or component that processes data, signals or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, a special-purpose processor to implement neural network model-based processing, neural circuits, processors optimized for matrix computations (e.g., matrix multiplication), or other systems. In some embodiments, processor 235 may include one or more co-processors that implement neural-network processing. In some embodiments, processor 235 may be a processor that processes data to produce probabilistic output, e.g., the output produced by processor 235 may be imprecise or may be accurate within a range from an expected output. Processing need not be limited to a particular geographic location or have temporal limitations. For example, a processor may perform its functions in real-time, offline, in a batch mode, etc. Portions of processing may be performed at different times and at different locations, by different (or the same) processing systems. A computer may be any processor in communication with a memory.

Memory 237 is typically provided in computing device 200 for access by the processor 235, and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 235 and/or integrated therewith.

Memory 237 can store software operating on the computing device 200 by the processor 235, including an operating system 262, other applications 264, application data 266, and the media application 103. Other applications 264 may include applications such as a camera application, an image gallery or image library application, data display engine, web hosting engine, image display engine, notification engine, social networking engine, etc. In some implementations, the media application 103 and other applications 264 can each include instructions that enable processor 235 to perform functions described herein.

The application data 266 may be data generated by the other applications 264 or hardware for the computing device 200. For example, the application data 266 may include images captured by the camera 243, user actions identified by the other applications 264 (e.g., a social networking application), etc.

I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or database 199), and input/output devices can communicate via I/O interface 239. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). For example, when a user provides touch input, I/O interface 239 transmits the data to the media application 103.

Some examples of interfaced devices that can connect to I/O interface 239 can include a display 241 that can be used to display content, e.g., images, video, and/or a user interface of an output application as described herein, and to receive touch (or gesture) input from a user. For example, display 241 may be utilized to display a user interface that includes corresponding media from one or more events. Display 241 can include any suitable display device such as a liquid crystal display (LCD), light emitting diode (LED), or plasma display screen, cathode ray tube (CRT), television, monitor, touchscreen, three-dimensional display screen, or other visual display device. For example, display 241 can be a flat display screen provided on a mobile device, multiple display screens embedded in a glasses form factor or headset device, or a monitor screen for a computer device.

Camera 243 may be any type of image capture device that can capture images and/or video. In some embodiments, the camera 243 captures images or video that the I/O interface 239 transmits to the media application 103.

The storage device 245 stores data related to the media application 103. For example, the storage device 245 may store the library of media associated with a user account, the selected sets of media, training sets for a machine-learning model, etc. In embodiments where the media application 103 is part of the media server 101, the storage device 245 is the same as the database 199 in FIG. 1.

First Example Media Application 103

The media application 103 illustrated in FIG. 2A includes a segmenting module 202, an event machine-learning module 204, a scoring module 206, a titling module 208, a title machine-learning module, and a user interface module 210.

The segmenting module 202 segments a library of media associated with a user account into episodes. In some embodiments, the segmenting module 202 includes a set of instructions executable by the processor 235 to segment the library of media. In some embodiments, the segmenting module 202 is stored in the memory 237 of the computing device 200 and can be accessible and executable by the processor 235.

In some embodiments, an episode, which includes a collection of media items, is defined as including media that is associated with timestamps that are within a corresponding time period. For example, the segmenting module 202 may define an episode as occurring within a 24-hour time period, 12 hours, two days, etc. In some embodiments, the time period for the episodes are automatically determined. In some embodiments, a user can define the time period, for example, via a user interface.

The event machine-learning module 204 generates an event signal that indicates a likelihood that an event occurred in each episode. In some embodiments, the event machine-learning module 204 includes a set of instructions executable by the processor 235 to generate the event signal. In some embodiments, the event machine-learning module 204 is stored in the memory 237 of the computing device 200 and can be accessible and executable by the processor 235.

In some embodiments, the event machine-learning module 204 may use training data to generate a trained model, specifically, an event machine-learning model. For example, training data may include any type of data such as media (e.g., images, videos, etc.) organized as events, reactions to the events (users viewing the event, sharing the event, ordering prints of media in the event, commenting on media items, etc.), and corresponding features (e.g., labels or tags associated with each media item that identify that an event occurred, a type of event, objects in the media items, etc.).

Training data may be obtained from any source, e.g., a data repository specifically marked for training, data for which permission is provided for use as training data for machine-learning, etc. In embodiments where one or more users permit use of their respective user data to train a machine-learning model, training data may include such user data. In some embodiments, user data may include images/videos or image/video metadata (e.g., images, corresponding features that may originate from users providing manual tags or labels, geotags that identify a location of an image, timestamps that are associated with the date of an event, etc.), communications (e.g., messages on a social network; email; chat data such as text messages, voice, video, etc.), documents (e.g., spreadsheets, text documents, presentations, etc.), etc.

In some embodiments, training data may include synthetic data generated for the purpose of training, such as data that is not based on user input or activity in the context that is being trained, e.g., data generated from simulated or computer-generated images/videos, etc. In some embodiments, the event machine-learning module 204 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The event machine-learning module 204 may read the data file for the trained model and implement neural networks with node connectivity, layers, and weights based on the model structure or form specified in the trained model.

The event machine-learning module 204 generates a trained model that is herein referred to as an event machine-learning model. In some embodiments, the event machine-learning module 204 is configured to apply the event machine-learning model to data, such as application data 266 (e.g., input media), to identify one or more features in an input media item, and to generate a feature vector (embedding) representative of the media item.

In some embodiments, the event machine-learning model is a classifier that receives media items along with information about the media items and uses the information to output the event signal that indicates a likelihood that an event occurred in each episode. The information may include the results of performing optical character recognition on the images to identify text within the image that is indicative of a particular event. For example, a menu at dinner may include the term "wedding" on it. In some embodiments, the information may include the results of performing object recognition to identify objects associated with an event. For example, a baby shower may have presents associated with babies.

In some implementations, metadata associated with a media item may be provided as additional input to the gating model, if the user permits. Metadata may include user-permitted factors such as a location and/or a time of capture of a video; whether a video was shared via a social network, an image sharing application, a messaging application, etc.; depth information associated with one or more video frames; sensor values of one or more sensors of a camera that captured the video, e.g., accelerometer, gyroscope, light sensor, or other sensors; an identity of the user (if user consent has been obtained), etc. For example, if the video was captured at night in an outdoor location with the camera pointing upwards, such metadata may indicate that the camera was pointed to the sky at the time of capture of the video, and therefore, is associated with an astronomical event.

In some embodiments, the event machine-learning module 204 may use a combination of metadata, optical character recognition, and other signals as inputs to the event machine-learning model. For example, the metadata may indicate that a person is using a firecracker and the date is July $4^{th}$, which results in the event machine-learning module 204 outputting an event signal that corresponds to Independence Day. In some embodiments, the event machine-learning module 204 also outputs an event type for one or more of the events. Continuing with the example above, the event machine-learning module 204 outputs the event signal and a likelihood that the event is Independence Day or a holiday.

In some embodiments, the event machine-learning module 204 may include software code to be executed by processor 235. In some embodiments, the event machine-learning module 204 may specify circuit configuration (e.g., for a programmable processor, for a field programmable gate array (FPGA), etc.) enabling processor 235 to apply the event machine-learning model. In some embodiments, the event machine-learning module 204 may include software instructions, hardware instructions, or a combination. In some embodiments, the event machine-learning module 204 may offer an application programming interface (API) that can be used by operating system 262 and/or other applications 264 to invoke the event machine-learning module 204, e.g., to apply the event machine-learning model to application data 266 to determine the one or more features of the input image.

In some embodiments, the event machine-learning model may include one or more model forms or structures. In some embodiments, the event machine-learning model could use a support vector machine, however, in some embodiments a convolutional neural network (CNN) is preferable. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 266. Such data can include, for example, one or more pixels per node, e.g., when the event machine-learning model is used for analysis, e.g., an input image, such as a first image associated with a user account. Subsequent intermediate layers may receive as input, output of nodes of a previous layer per the connectivity specified in the model form or structure. These layers may also be referred to as hidden layers. A final layer (e.g., output layer) produces an output of the machine-learning application. For example, the output may be image features that are associated with the input image. In some embodiments, the model form or structure also specifies a number and/or type of nodes in each layer.

In some embodiments, the model form is a CNN with network layers where each network layer extracts image features at different levels of abstraction. A CNN that is used to identify features in an image may be used for image classification. The model architecture may include combinations and orderings of layers made up of multi-dimensional convolutions, average pooling, max pooling, activation functions, normalization, regularization, and other layers and modules used in practice for applied deep neural networks.

In different embodiments, the event machine-learning model can include one or more models. One or more of the models may include a plurality of nodes, or in the case of a CNN-filter bank, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. The different layers may include different types of input associated with a media item, such as a first layer for metadata, a second layer for optical character recognition, and a third layer for object recognition.

In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processor cores of a multicore processor, using individual processing units of a graphical processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the event machine-learning model may include embeddings or weights for individual nodes. For example, the event machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The event machine-learning model may then be trained, e.g., using the training set of digital images, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., media organized as events) and a corresponding expected output for each input (e.g., an event signal for each event). Based on a comparison of the output of the event machine-learning model with the expected output, values of the weights are automatically adjusted, e.g., in a manner that increases a probability that the event machine-learning model produces the expected output of identifying events from a library of media by analyzing pixels and metadata when provided with input that includes groundtruth event identification being provided as training data.

In some embodiments, training may include applying unsupervised learning techniques. For example, only input data (e.g., media organized as events) may be provided and the event machine-learning model may be trained to differentiate data, e.g., to identify media that are likely to be classified as an event. In another example, the event machine-learning model may train itself to generate events by differentiating between the media items in the events.

In various embodiments, a trained model includes a set of weights, corresponding to the model structure. In embodiments where a training set of digital images is omitted, the event machine-learning module 204 may generate an event machine-learning model that is based on prior training, e.g., by a developer of the event machine-learning module 204, by a third-party, etc. In some embodiments, the event machine-learning model may include a set of weights that are fixed, e.g., downloaded from a server that provides the weights.

In some embodiments, the event machine-learning module 204 may be implemented in an offline manner. In some embodiments, small updates of the event machine-learning model may be implemented in an online manner. In such embodiments, an application that invokes the event machine-learning module 204 (e.g., operating system 262, one or more of other applications 264, etc.) may utilize feature detection produced by the event machine-learning module 204 and may generate system logs (e.g., if permitted by the user, an action taken by the user based on the feature detection; or if utilized as input for further processing, a result of the further processing). System logs may be produced periodically, e.g., hourly, monthly, quarterly, etc. and may be used, with user permission, to update the event machine-learning model, e.g., to update embeddings for the event machine-learning model.

In some embodiments, the event machine-learning module 204 may be implemented in a manner that can adapt to a particular configuration of the computing device 200 on which the event machine-learning module 204 is executed. For example, the event machine-learning module 204 may determine a computational graph that utilizes available computational resources, e.g., processor 235. For example, if the event machine-learning module 204 is implemented as a distributed application on multiple devices, the event machine-learning module 204 may determine computations to be carried out on individual devices in a manner that optimizes computation. In another example, the event machine-learning module 204 may determine that processor 235 includes a GPU with a particular number of GPU cores (e.g., 1000) and implement the event machine-learning module 204 accordingly (e.g., as 1000 individual processes or threads).

In some embodiments, the event machine-learning module 204 may implement an ensemble of trained models. For example, the event machine-learning model may include a plurality of trained models that are each applicable to the same input data. In these embodiments, the event machine-learning module 204 may choose a particular trained model, e.g., based on available computational resources, success rate with prior inferences, etc.

In some embodiments, the event machine-learning module 204 may execute a plurality of trained models. In these embodiments, the event machine-learning module 204 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the event machine-learning module 204 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the event machine-learning module 204, e.g., by operating system 262 or one or more other applications 264.

The scoring module 206 generates an event significance score for each episode. In some embodiments, the scoring module 206 includes a set of instructions executable by the processor 235 to score the episode and to determine one or more events from the episode. In some embodiments, the scoring module 206 is stored in the memory 237 of the computing device 200 and can be accessible and executable by the processor 235.

In some embodiments, the scoring module 206 generates an event significance score for each episode. The scoring module 206 may generate an event significance score based on data for all users who have permitted use of their user data. This may be applied when a user has a number of media items in the library that fall below a threshold. In some embodiments, the scoring module 206 generates the event significance score based on data that is particular to a user, for example, if the image includes the user or a person that is significant to the user (for example, one that appears in a threshold number of the media items associated with a user), if the episode occurs at a place that is important (e.g., visited frequently or familiar to the user) or rare to the user, based on previous user reactions (sharing a media item, printing the media item, providing an indication of approval of the media item (e.g., loving the media item), editing the media item, viewing the media item), or predicting how the user would respond to an episode. For example, if a user consistently views images of a particular person, a birthday party, and Christmas images the scoring module 206 may apply scores to similar images that indicate that those images are meaningful to the user. In another example, the scoring module 206 generates the event significance score based on similarity of the episode to an event that was considered significant.

In some embodiments, the scoring module 206 further determines the event significance score based on a threshold number of media items in a corresponding episode. For example, an episode may need to have at least five media items (or seven, or 10, etc.) to qualify for being an event. In some embodiments, the scoring module 206 further determines the event significance score based on a higher number of media items in the corresponding episode, at least one face cluster of a threshold rank in the corresponding episode, or a presence of a rare face cluster. In some embodiments, the scoring module 206 further determines the event significance score based on a quality indicator of the media items in the corresponding episode. For example, the quality indicator may be based on whether the media item is blurry, over saturated, has objects that are out of focus, etc.

In some embodiments, the scoring module 206 combines multiple episodes into a single event based on the multiple episodes occurring within a 24-hour period (e.g., many celebrations for a birthday), the single event being a type of event that occurs over multiple days (e.g. Hanukkah, Diwali, Ramadan, Cherry Blossom Festival), celebrations on different days that relate to the single event (e.g., an Indian wedding; Christmas including lighting a tree, family dinner, opening presents), the multiple episodes involving a same location (e.g., a work retreat where meals are held at the same location), or the multiple episodes involving a same set of people as identified by the same set of face clusters. In some embodiments, the scoring module 206 combines days into an event that are up to 31 days long since that encompasses even longer events (e.g., Ramadan is 30 days and the Cherry Blossom Festival is 21 days).

In some embodiments, the scoring module 206 receives an event type from the event machine-learning module 204 (e.g., a birthday) and combines multiple events within a predetermined time period from the event type (e.g., combine all birthday-related celebrations that occur within plus or minus five days from the birthday date). For example, a birthday may include a party, but also related occurrences like a dinner that occurs before or after the birthday.

In some embodiments, the scoring module 206 receives the event type from the event machine-learning module 204 and generates a confidence score that indicates a likelihood that a corresponding event is a type of event that is accurately recognized. For example, the scoring module 206 may receive the same information described above with reference to the event machine-learning module 204 about optical character recognition, object recognition, and metadata and generate the confidence score for the type of event based on text in the media items, objects identified in the media items corresponding to a type of event (e.g., Santa hat for Christmas, flowers and a chocolate heart for Valentine's day), a date of the particular event corresponding to a known holiday (e.g., Christmas, Valentine's day), etc. The confidence score may be a value (1, 0.4, 500), a percentage (5%, 44%, etc.), or a different metric.

In some embodiments, the scoring module 206 uses a scoring machine-learning model to output the event significance score. In this example, the scoring machine-learning model may receive user actions as input as part of a training set to train the scoring machine-learning model. Once the scoring machine-learning model is trained. the scoring machine-learning model may receive an episode as input and outputs the event significance score.

In some embodiments, the scoring module 206 determines one or more events from the episodes based on the event signal received by the event machine-learning module 204 and a corresponding event significance score exceeding a threshold event significance value. The scoring module 206 may instruct the user interface module 210 to display the events with corresponding event significance scores that exceed the threshold event significance value in a grid.

In some embodiments, the events may be generated periodically. For example, the one or more events may be limited to a predetermined number each month (e.g., seven) to avoid overwhelming the user with different events. When new media is received, for example, by another user sharing the media with a first user, the first user may associate the new media with the library of media. The scoring module 206 generates an event significance score for the episode that includes the new media and if the event significance score exceeds a threshold event significance value, the scoring module 206 determines if the event significance score is greater than an event significance score for a particular event that is displayed in the user interface, the scoring module 206 may instruct the user interface 210 to replace the previous event with the new event.

The titling module 208 generates a title for an event. In some embodiments, the titling module 208 includes a set of instructions executable by the processor 235 to generate the title. In some embodiments, the titling module 208 is stored in the memory 237 of the computing device 200 and can be accessible and executable by the processor 235.

In some embodiments, the titling module 208 receives an event signal from the event machine-learning module 204 that indicates a likelihood that an event occurred in each episode. The titling module 208 may additionally receive an identification of a type of event from the event machine-learning module 204. The titling module 208 may use the type of event to determine a title for the event that is descriptive of the type of event.

Figure 3:
FIG. 3 illustrates example titles based on confidence scores that indicate a likelihood that a corresponding event is a type of event that is accurately recognized, according to some embodiments.
Figure 3:
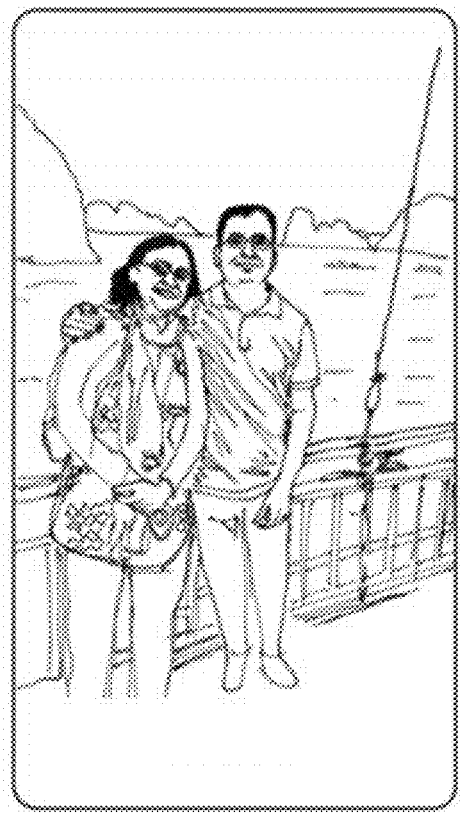

In some embodiments, the titling module 208 receives the confidence score from the scoring module 206 that indicates a likelihood that a corresponding event is a type of event that is accurately recognized. If the confidence score meets a threshold confidence value, the titling module 208 adds a title to the corresponding event based on the type of event. For example, FIG. 3 includes a first example 600 of an image of two people embracing where the man is holding flowers where the confidence score meets the threshold value and the titling module 208 applies the title of "Valentine's Day" to the corresponding event. This may occur if, for example, the scoring module 206 determines that based on location of the image being a restaurant, the date of the image being captured, and the man holding flowers that the image was taken as part of a Valentine's Day outing. In another example, the titling module 206 uses a high-confidence title if greater than 50% (or 40%, 90%, etc.) of the media items in the event are determined to have at least a 90% confidence (or 85%, etc.). In some embodiments, if an event has a high-confidence value and only occurs once a year, the titling module 208 appends the year to the title (e.g., Diwali 2019).

If the confidence score fails to meet the threshold confidence value, the titling module 208 adds the title to the corresponding event based on a template phrase that suggests the type of event without being explicit enough to be interpreted as a mistake, such as "Celebrate love and laughter" for an event that occurs shortly after the user's birthday. Continuing with the example above, FIG. 3 includes a second example 350 where the confidence score fails to meet the threshold value and the titling module 208 applies the template phrase "Day of Hearts" because, although the image was captured on Valentine's Day, the location is a camping location and the woman is not holding flowers. The scoring module 206 may determine the confidence score based on a totality of the media items for the corresponding event.

The title machine-learning module 258 generates a title for an event. In some embodiments, the title machine-learning module 258 includes a set of instructions executable by the processor 235 to generate the title. In some embodiments, the title machine-learning module 258 is stored in the memory 237 of the computing device 200 and can be accessible and executable by the processor 235.

In some embodiments, the title machine-learning module 258 may use training data to generate a trained model, specifically, a title machine-learning model. For example, training data may include any type of data such as media (e.g., images, videos, etc.) organized as events, titles for the events, and corresponding features (e.g., labels or tags associated with each media item that identify that an event occurred, a type of event, objects in the media items, etc.).

Training data may be obtained from any source, e.g., a data repository specifically marked for training, data for which permission is provided for use as training data for machine-learning, etc. In embodiments where one or more users permit use of their respective user data to train a machine-learning model, training data may include such user data. In some embodiments, user data may include images/videos or image/video metadata (e.g., images, corresponding features that may originate from users providing manual titles, tags, labels, geotags that identify a location of an image, timestamps that are associated with the date of an event, etc.), communications (e.g., messages on a social network; email; chat data such as text messages, voice, video, etc.), documents (e.g., spreadsheets, text documents, presentations, etc.), etc.

In some embodiments, training data may include synthetic data generated for the purpose of training, such as data that is not based on user input or activity in the context that is being trained, e.g., data generated from simulated or computer-generated images/videos, etc. In some embodiments, the title machine-learning module 258 uses weights that are taken from another application and are unedited/transferred. For example, in these embodiments, the trained model may be generated, e.g., on a different device, and be provided as part of the media application 103. In various embodiments, the trained model may be provided as a data file that includes a model structure or form (e.g., that defines a number and type of neural network nodes, connectivity between nodes and organization of the nodes into a plurality of layers), and associated weights. The title machine-learning module 258 may read the data file for the trained model and implement neural networks with node connectivity, layers, and weights based on the model structure or form specified in the trained model.

The title machine-learning module 258 generates a trained model that is herein referred to as a title machine-learning model. In some embodiments, the title machine-learning module 258 is configured to apply the title machine-learning model to data, such as application data 267 (e.g., input media), to identify one or more features in an input media item, and to generate a feature vector (embedding) representative of the media item.

In some embodiments, the media application 103 includes either a titling module 208 or a title machine-learning module 258. In some embodiments, the titling module 208 and the title machine-learning module 258 are the same module. In some embodiments, the title machine-learning module 258 is stored on the media server while the remaining modules are stored on the user device 115.

In some implementations, metadata associated with a media item may be provided as additional input to the gating model, if the user permits. Metadata may include user-permitted factors such as a location and/or a time of capture of a video; whether a video was shared via a social network, an image sharing application, a messaging application, etc.; depth information associated with one or more video frames; sensor values of one or more sensors of a camera that captured the video, e.g., accelerometer, gyroscope, light sensor, or other sensors; an identity of the user (if user consent has been obtained), etc. For example, if the video was captured at night in an outdoor location with the camera pointing upwards, such metadata may indicate that the camera was pointed to the sky at the time of capture of the video, and therefore, is associated with an astronomical event.

In some embodiments, the title machine-learning module 258 may include software code to be executed by processor 285. In some embodiments, the title machine-learning module 258 may specify circuit configuration (e.g., for a programmable processor, for a field programmable gate array (FPGA), etc.) enabling processor 285 to apply the title machine-learning model. In some embodiments, the title machine-learning module 258 may include software instructions, hardware instructions, or a combination. In some embodiments, the title machine-learning module 258 may offer an application programming interface (API) that can be used by operating system 263 and/or other applications 265 to invoke the title machine-learning module 258, e.g., to apply the title machine-learning model to application data 267 to determine the one or more features of the input image.

In some embodiments, the title machine-learning model may include one or more model forms or structures. In some embodiments, the title machine-learning model could use a support vector machine, however, in some embodiments a convolutional neural network (CNN) is preferable. For example, model forms or structures can include any type of neural-network, such as a linear network, a deep neural network that implements a plurality of layers (e.g., "hidden layers" between an input layer and an output layer, with each layer being a linear network), a convolutional neural network (CNN) (e.g., a network that splits or partitions input data into multiple parts or tiles, processes each tile separately using one or more neural-network layers, and aggregates the results from the processing of each tile), a sequence-to-sequence neural network (e.g., a network that receives as input sequential data, such as words in a sentence, frames in a video, etc. and produces as output a result sequence), etc.

The model form or structure may specify connectivity between various nodes and organization of nodes into layers. For example, nodes of a first layer (e.g., input layer) may receive data as input data or application data 267. Such data can include, for example, one or more pixels per node, e.g., when the title machine-learning model is used for analysis, e.g., an input image, such as a first image associated with a user account. Subsequent intermediate layers may receive as input, output of nodes of a previous layer per the connectivity specified in the model form or structure. These layers may also be referred to as hidden layers. A final layer (e.g., output layer) produces an output of the machine-learning application. For example, the output may be a title associated with the input image. In some embodiments, the model form or structure also specifies a number and/or type of nodes in each layer.

In some embodiments, the model form is a CNN with network layers where each network layer extracts image features at different levels of abstraction. A CNN that is used to identify features in an image may be used for image classification. The model architecture may include combinations and orderings of layers made up of multi-dimensional convolutions, average pooling, max pooling, activation functions, normalization, regularization, and other layers and modules used in practice for applied deep neural networks.

In different embodiments, the title machine-learning model can include one or more models. One or more of the models may include a plurality of nodes, or in the case of a CNN—a filter bank, arranged into layers per the model structure or form. In some embodiments, the nodes may be computational nodes with no memory, e.g., configured to process one unit of input to produce one unit of output. Computation performed by a node may include, for example, multiplying each of a plurality of node inputs by a weight, obtaining a weighted sum, and adjusting the weighted sum with a bias or intercept value to produce the node output. The different layers may include different types of input associated with a media item, such as a first layer for metadata, a second layer for optical character recognition, and a third layer for object recognition.

In some embodiments, the computation performed by a node may also include applying a step/activation function to the adjusted weighted sum. In some embodiments, the step/activation function may be a nonlinear function. In various embodiments, such computation may include operations such as matrix multiplication. In some embodiments, computations by the plurality of nodes may be performed in parallel, e.g., using multiple processor cores of a multicore processor, using individual processing units of a graphical processing unit (GPU), or special-purpose neural circuitry. In some embodiments, nodes may include memory, e.g., may be able to store and use one or more earlier inputs in processing a subsequent input. For example, nodes with memory may include long short-term memory (LSTM) nodes. LSTM nodes may use the memory to maintain state that permits the node to act like a finite state machine (FSM). Models with such nodes may be useful in processing sequential data, e.g., words in a sentence or a paragraph, a series of images, frames in a video, speech or other audio, etc. For example, a heuristics-based model used in the gating model may store one or more previously generated features corresponding to previous images.

In some embodiments, the title machine-learning model may include embeddings or weights for individual nodes. For example, the title machine-learning model may be initiated as a plurality of nodes organized into layers as specified by the model form or structure. At initialization, a respective weight may be applied to a connection between each pair of nodes that are connected per the model form, e.g., nodes in successive layers of the neural network. For example, the respective weights may be randomly assigned, or initialized to default values. The title machine-learning model may then be trained, e.g., using the training set of digital images, to produce a result. In some embodiments, subsets of the total architecture may be reused from other machine-learning applications as a transfer learning approach in order to leverage pre-trained weights.

For example, training may include applying supervised learning techniques. In supervised learning, the training data can include a plurality of inputs (e.g., media organized as events) and a corresponding expected output for each input (e.g., a title for each event). Based on a comparison of the output of the title machine-learning model with the expected output, values of the weights are automatically adjusted, e.g., in a manner that increases a probability that the title machine-learning model produces the expected output of an appropriate tile.

In some embodiments, training may include applying unsupervised learning techniques. For example, only input data (e.g., media organized as events and titles) may be provided and the title machine-learning model may be trained to differentiate data, e.g., to identify events associated with different titles. In another example, the title machine-learning model may train itself to generate titles by differentiating between the media items in the events.

In various embodiments, a trained model includes a set of weights, corresponding to the model structure. In embodiments where a training set of digital images is omitted, the title machine-learning module 258 may generate a title machine-learning model that is based on prior training, e.g., by a developer of the title machine-learning module 258, by a third-party, etc. In some embodiments, the title machine-learning model may include a set of weights that are fixed, e.g., downloaded from a server that provides the weights.

In some embodiments, the title machine-learning module 258 may be implemented in an offline manner. In some embodiments, small updates of the title machine-learning model may be implemented in an online manner. In such embodiments, an application that invokes the title machine-learning module 258 (e.g., operating system 263, one or more of other applications 265, etc.) may utilize feature detection produced by the title machine-learning module 258 and may generate system logs (e.g., if permitted by the user, an action taken by the user based on the feature detection; or if utilized as input for further processing, a result of the further processing). System logs may be produced periodically, e.g., hourly, monthly, quarterly, etc. and may be used, with user permission, to update the title machine-learning model, e.g., to update embeddings for the title machine-learning model.

In some embodiments, the title machine-learning module 258 may be implemented in a manner that can adapt to a particular configuration of the computing device 200 on which the title machine-learning module 258 is executed. For example, the title machine-learning module 258 may determine a computational graph that utilizes available computational resources, e.g., processor 285. For example, if the title machine-learning module 258 is implemented as a distributed application on multiple devices, the title machine-learning module 258 may determine computations to be carried out on individual devices in a manner that optimizes computation. In another example, the title machine-learning module 258 may determine that processor 285 includes a GPU with a particular number of GPU cores (e.g., 1000) and implement the title machine-learning module 258 accordingly (e.g., as 1000 individual processes or threads).

In some embodiments, the title machine-learning module 258 may implement an ensemble of trained models. For example, the title machine-learning model may include a plurality of trained models that are each applicable to the same input data. In these embodiments, the title machine-learning module 258 may choose a particular trained model, e.g., based on available computational resources, success rate with prior inferences, etc.

In some embodiments, the title machine-learning module 258 may execute a plurality of trained models. In these embodiments, the title machine-learning module 258 may combine outputs from applying individual models, e.g., using a voting-technique that scores individual outputs from applying each trained model, or by choosing one or more particular outputs. In some embodiments, such a selector is part of the model itself and functions as a connected layer in between the trained models. Further, in these embodiments, the title machine-learning module 258 may apply a time threshold for applying individual trained models (e.g., 0.5 ms) and utilize only those individual outputs that are available within the time threshold. Outputs that are not received within the time threshold may not be utilized, e.g., discarded. For example, such approaches may be suitable when there is a time limit specified while invoking the title machine-learning module 258, e.g., by operating system 263 or one or more other applications 265.

In some embodiments, the title machine-learning module 258 receives an edit from a user of a title. The title machine-learning module 258 incorporates the feedback into the title machine-learning model to modify the parameters to improve the output of titles.

The user interface module 210 generates a user interface. In some embodiments, the user interface module 210 includes a set of instructions executable by the processor 235 to generate the user interface. In some embodiments, the user interface module 210 is stored in the memory 237 of the computing device 200 and can be accessible and executable by the processor 235.

In some embodiments, the user interface module 210 provides a user interface that includes an event item with corresponding media from a particular event of the one or more events determined by the scoring module 206. The particular event may be featured more prominently in the user interface than other items in the user interface. For example, FIG. 4 includes a first example 400 with media items from March and an event item titled "The Happy Couple."

Figure 4:
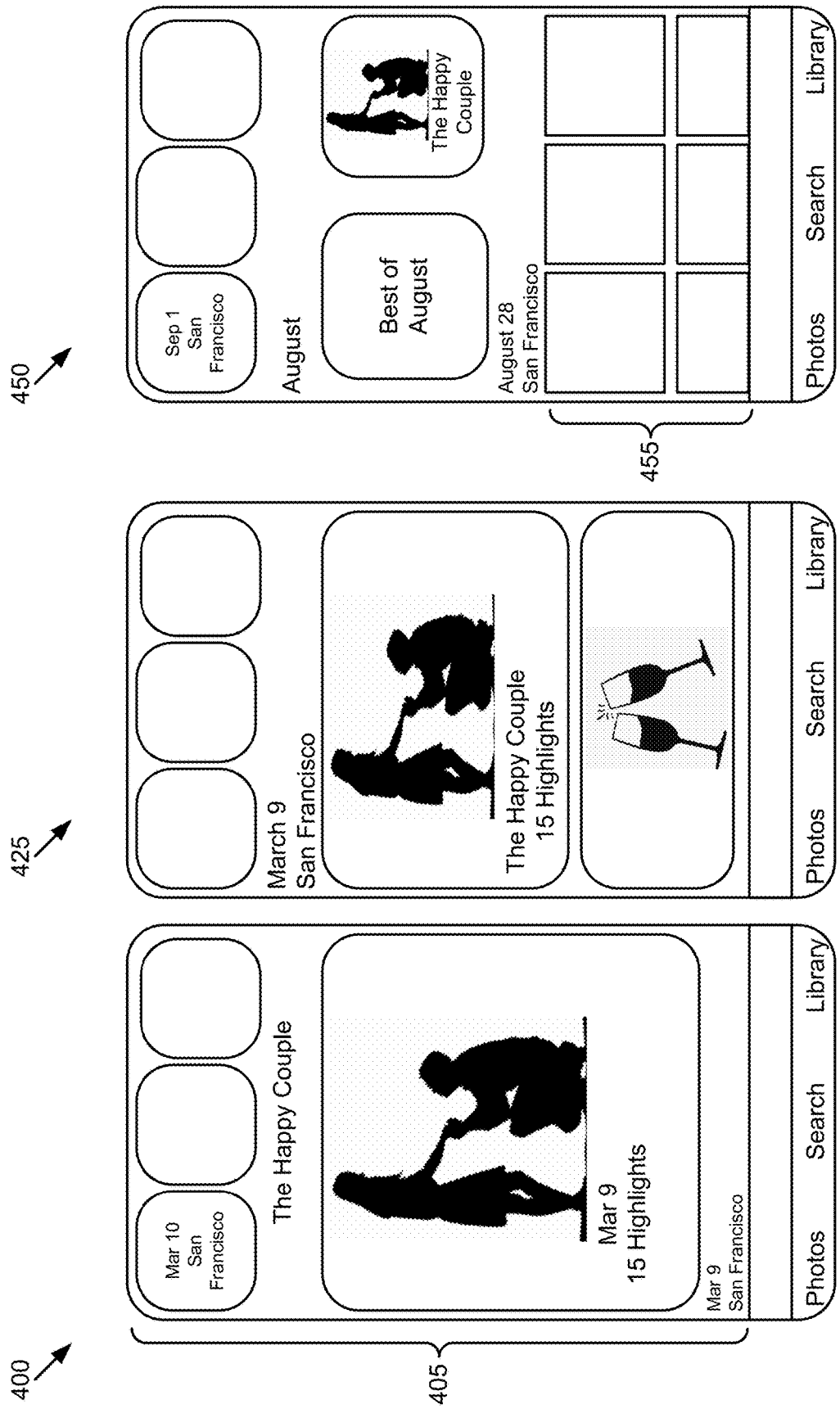
FIG. 4 illustrates an example reverse-chronological grid of media, according to some embodiments.

The user interface module 210 may be part of a reverse-chronological grid of media that includes corresponding media, a chronological grid, or have no organization based on a time of capture of the media items. Continuing with the above example, FIG. 4 illustrates the first example 400 of a reverse-chronological grid 405 that includes media items from March 10, the event item titled "The Happy Couple," and a media item from March 9th. In some embodiments, the events with the highest scores are selected by the user interface module 210 to appear in the reverse-chronological grid. In some embodiments, a predetermined amount of time must have elapsed (e.g., a week, two days, etc.) for the event to be displayed in the reverse-chronological grid.

In some embodiments, the user interface module 210 may generate a user interface with different levels of prominence for the event. For example, the first example 400 in FIG. 4 is a larger grid tile where the event appears as a large tile interspersed in the reverse-chronological grid with a title header. In some embodiments, the user interface module 210 determines whether to display the event with a larger grid tile or as a smaller grid tile as discussed below based on the event significance score.

FIG. 4 also includes a second example 425 with a smaller grid tile where a first media item from the particular event is less prominently featured and a second media item from the particular event is featured and the event appears interspersed in the reverse-chronological grid. In some embodiments, an event in the user interface appears below a date header that corresponds to the event.

FIG. 4 further includes a third example 450 where a summary of the highlights for the month and a list of images from the same month are displayed in a bottom section 455 of the user interface and where the particular event is least prominently featured as the particular event. Any events displayed inline in the reverse-chronological grid are also included in the monthly highlights carousel in the bottom section 455.

In some embodiments, the user interface module 210 displays an event in a user interface after a predetermined amount of time has elapsed (e.g., 21 days). In some embodiments where an event includes multiple days that span two different months, the user interface module 210 displays the event in a monthly highlights carousel section based on the month in which the event ended. For example, if the event occurred between October 2 to November 1, the event would only show in the November highlights carousel. In some embodiments, where multiple events occur in a single day, the user interface module 210 selects the event with the best event significance score to display for that day.

In some embodiments, when the user selects the event item from the grid, the user interface module 210 replaces the grid with a display of the corresponding media items from the particular event for a predetermined time duration. For example, if a user selected the event item "The Happy Couple" from FIG. 4, the user interface module 210 displays a video of the proposal, an image of the ring, images of the park where the proposal occurred, etc. The user interface module 210 may display each media item from the particular event for a predetermined period of time (e.g., two seconds, five seconds, etc.). For example, the user interface module 210 may use the entire user interface to display each media item individually for two seconds.

In some embodiments, the user interface includes elements that allows users to navigate forward and back, among media items at their own pace, and also includes elements that enable actions such as sharing, ordering prints, marking as favorite, etc. Once the display of the media items is complete (or the user exits out of displaying the corresponding media items), the user interface module 210 may display the grid again.

In some embodiments, the corresponding media from the one or more events is displayed with a size that is dependent on one or more of the event significance score, a number of media items for the one or more events, a total number of events in a period of time, or an event type (e.g., my wedding versus a friend's wedding). For example, in the example 400 in FIG. 4, the event item "The Happy Couple" is displayed with a larger size based on the event significance score indicating a top ranking.

In some embodiments, the user interface module 210 receives a request from the user to remove depictions of a person from the media in the library of media that include depictions of the person. For example, a user interface may allow a user to click on an image to remove the image from the library of media, a user interface may confirm that the image was removed, and a user interface may provide a page that requests feedback about why the user requested that the depiction of the person be removed. The feedback may be used by the user interface module 210 as input to the event machine-learning model and/or to modify the event significance score. In some embodiments, the scoring module 206 filters the depiction of the person from the media before the event significance score is generated. This may advantageously avoid the user interface module 210 displaying media associated with events that have too few media items after the depiction of the person is removed from the media or avoid displaying events that are about or feature the hidden depiction of the person.

Figure 5:
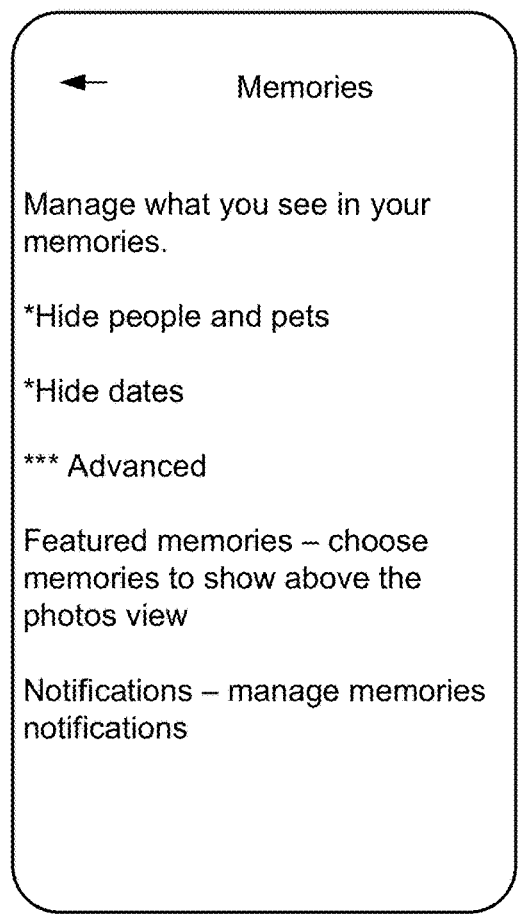
FIG. 5 illustrates an example user interface for removing media items from events, according to some embodiments.

The user interface may include options for curating the grid and library of media. In some embodiments, the user interface includes an option to hide or an option to add one or more of a media item from the one or more events, a date associated with the one or more events, or a person or pet depicted in media items from the one or more events. FIG. 5 includes an example user interface 500 that provides users with options to hide people and pets or hide dates from the media associated with events. The example user interface 500 also includes options for choosing memories to promote to the reverse-chronological grid and an option to manage notifications relating to memories, such as whether to provide daily reminders, silence notifications, etc.

Figure 6:
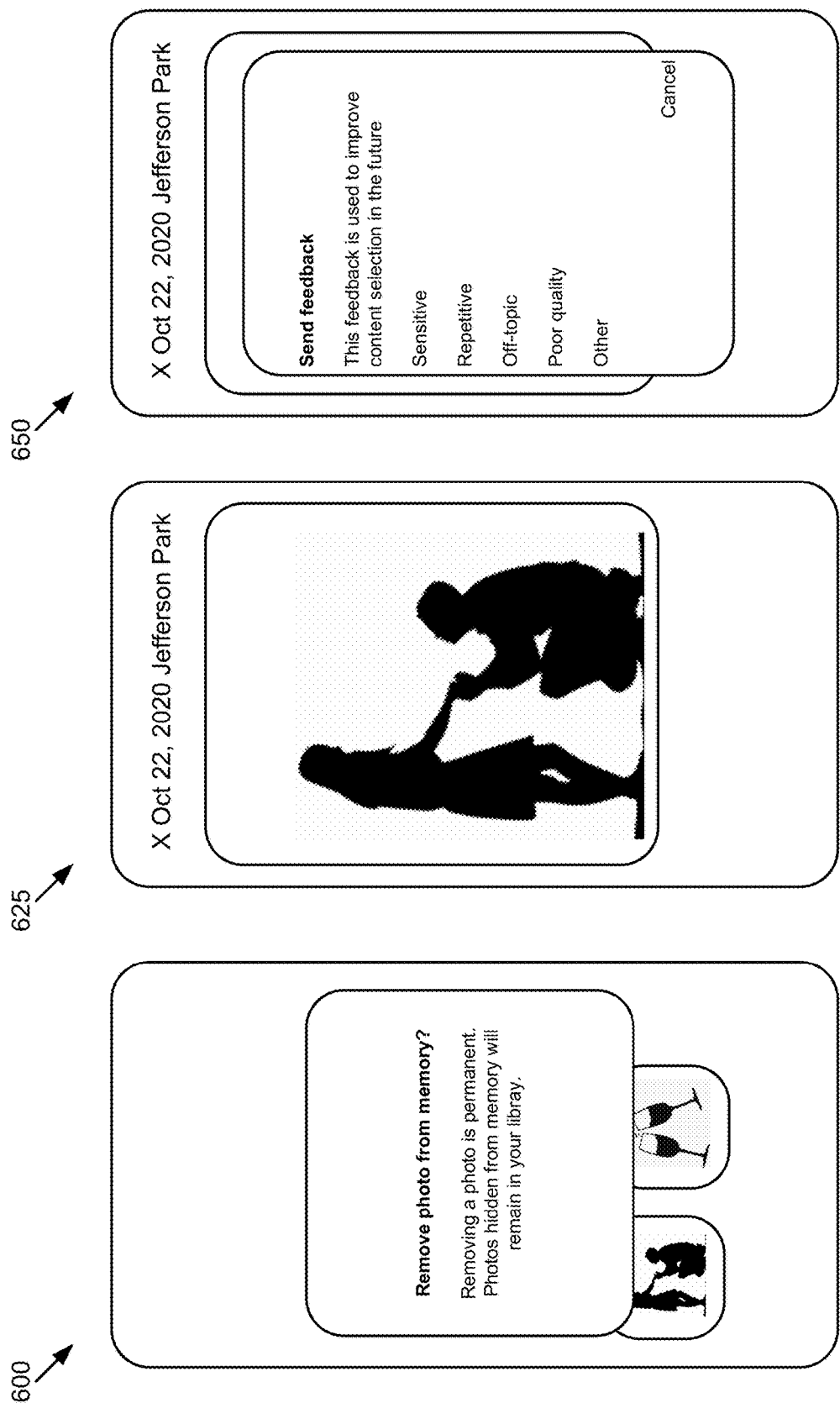
FIG. 6 illustrates an example user interface with the option to remove a media item from an event item and provide feedback, according to some embodiments.

In some embodiments, the user interface includes an option to remove an event item. Removing the event item ensures that the event item is not shown to the user in the future, but the corresponding media items remain in the library of media associated with the user account. In some embodiments, the user interface includes an option to remove a media item from the event item. Removing the media item from the event item does not remove the media item from the library of media associated with the user account. FIG. 6 includes an example where the user interface includes a request 600 for confirmation, a confirmation 625 that the media item was removed, and a feedback screen 650 requesting feedback about why the user wanted to remove the media item from the event item. The example options for feedback include that the event item was sensitive, repetitive, off-topic, poor quality, or other.

In some embodiments, the user interface module 210 transmits feedback to the event machine-learning module 204, which uses the feedback to modify the parameters of the event machine-learning model. In some embodiments, the user interface module 210 transmits the feedback to the scoring module 206, which modifies the event significance score accordingly.

In some embodiments, the user interface includes options for modifying details of an event. For example, the user interface includes an option to edit the corresponding media from the one or more events. In yet another example, the user interface includes an option to change a title of the one or more events while the one or more events are displayed in the user interface. In some embodiments, the titling module 208 uses the feedback to improve the generation of titles.

Figure 7:
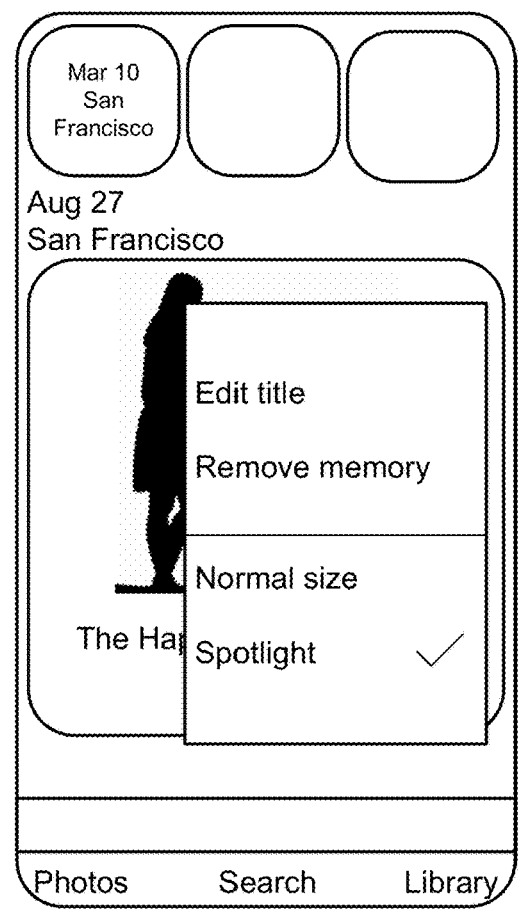
FIG. 7 illustrates an example user interface with options for editing a title, removing an event, changing a size of the event in a reverse-chronological grid, and changing an importance of the event in the reverse-chronological grid, according to some embodiments.

FIG. 7 illustrates an example user interface 700 with options for editing a title, removing an event, changing a size of the event in a grid, and changing an importance of the event in the grid, according to some embodiments. In this example, the user may access these options by right clicking on the event in the user interface 700 or some other mechanism. In some embodiments, these edits are available when the event is shown in the user interface 700 or during display of the media items in the event.

Selecting "edit title" results in the title being different in the user interface 700. Selecting "remove memory" results in the media items associated with the event remaining in the library associated with the user, but the event not appearing in the user interface in the future. Selecting "normal size" results in the event being displayed in the user interface 700 with a regular size, such as the second example 425 in FIG. 4, instead of the larger size in the first example 400 or the smaller size in the third example 450 in FIG. 4. Selecting "spotlight" results in the event being displayed in the user interface 700 with a larger size, such as the first example 400 in FIG. 4.

In some embodiments, the user interface module 210 generates audio for the corresponding media that is based on a type of the one or more events. For example, for happy events such as a graduation or a wedding, the music may be happy music. For a more serious event, such as a funeral, the music may be more somber.

In some embodiments, in response to a user editing an aspect of an event, such as editing a title of the event, the user interface module 210 keeps the event in the user interface even if the scoring module 206 scores a different event as higher than the edited event. This may be referred to as a "frozen" event. In some embodiments, the user interface module 210 keeps the event in the user interface until the predetermined time period (e.g., October) ends. Conversely, in some embodiment, if a user removes a media item from the library, the user interface module 210 removes the media item from an event.

In some embodiments, the user interface module 210 reorganizes the different events in a user interface based on different changes. Turing to FIG. 8A, an example block diagram 800 is illustrated that shows different examples of reorganizing of different events based on changes where the grid in the user interface limits the number of events to seven. The first example 805 includes a list of events that are displayed in the grid where corresponding event significance scores range from 70/100 to 99/100.

A user uploads media items from a DSLR camera, which causes the scoring module 206 to generate a new event 810 with an event significance score of 81/100, which is higher than five of the events that are in the grid. As a result, the event with the lowest event score (i.e., 70/100) is removed from the grid and the new event is added. The user interface module 210 adds the new event 810 to the list of events, resulting in a second example 815 where the new event 810 is added and the event with the lowest event significance score of 70/100 is removed from the user interface. The removed event is shown with strikethrough in the second example 815.

Figure 8A:
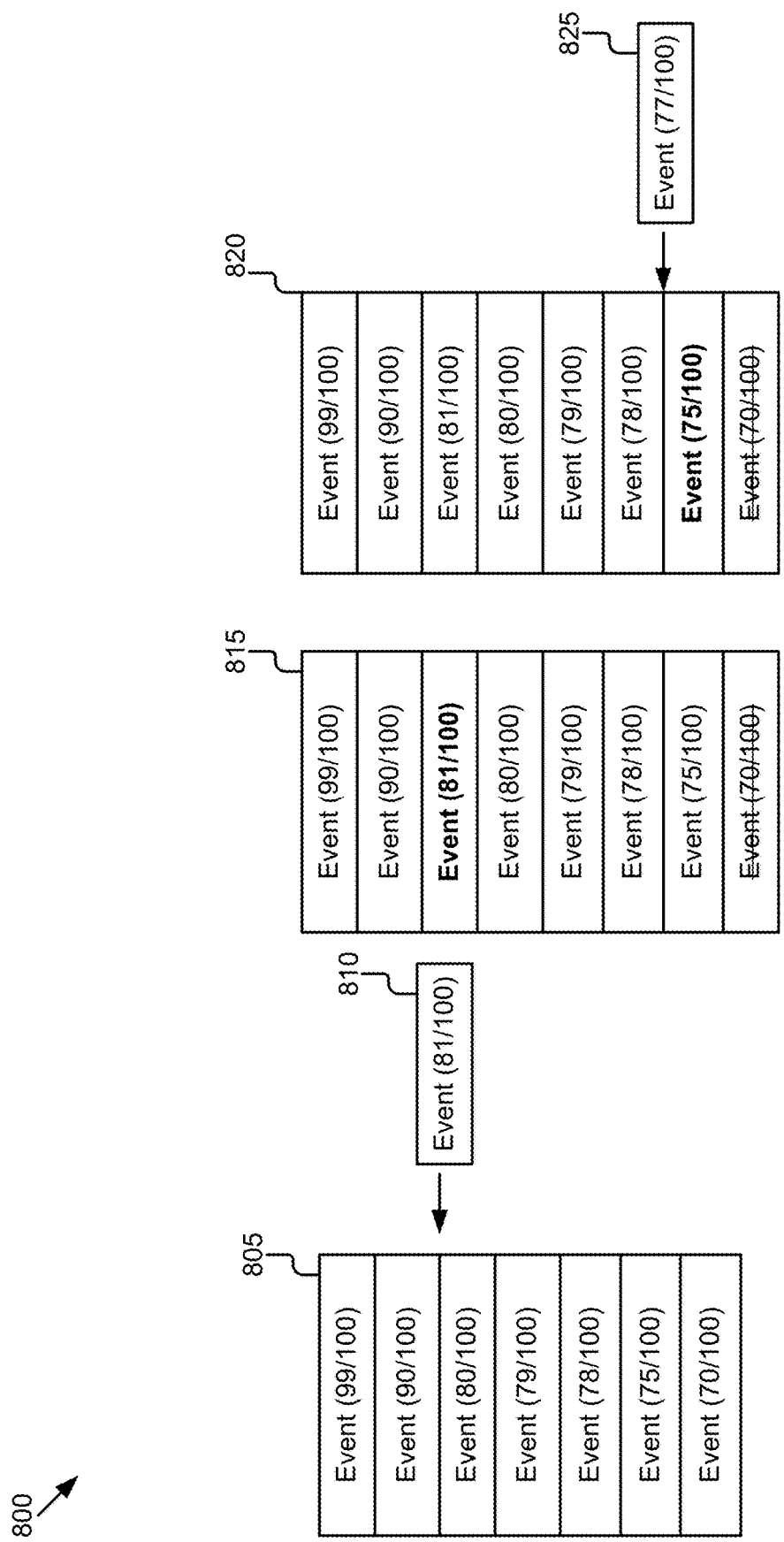

Continuing with the examples in FIG. 8A, a user edits a title of an event with a score of 75/100, which means that the event is frozen and stays in the grid. The user then uploads media items from a DSLR camera and the scoring module 206 generates a new event 825 with a score of 77/100. Because the event with the score of 77/100 is higher than the score of 75/100, the new event 825 would normally cause the second event to be removed from the grid. But since the second event is frozen, the second event also remains in the grid. As a result, FIG. 8B illustrates a block diagram 850 with a third example 835 where the grid now includes eight events.

Continuing with the example in FIG. 8B, a user uploads media items from a DSLR camera and the scoring module 206 generates a new event with a score of 88/100. Because the new event 840 has a higher score than the previous event with the score of 77/100, and because the event with the score of 75/100 is frozen, the previous event with the score of 77/100 is removed from the grid. The fourth example 845 illustrates the remaining events in the grid along with the events with the 77/100 and the 70/100 event significance scores that were removed from the grid (as illustrated using strikethrough).

In some embodiments, the user interface module 210 generates a user interface to provide a user with event memories. For example, the user interface module 210 may generate an icon that appears on the top of a user's screen that, when selected, causes the user interface to display the media items associated with the event. In some embodiments, the user interface module 210 selects an event that occurred a predetermined amount of time (e.g., a year ago), an event with the highest event significance score, a random event, etc.

Example Method 900

Figure 9:
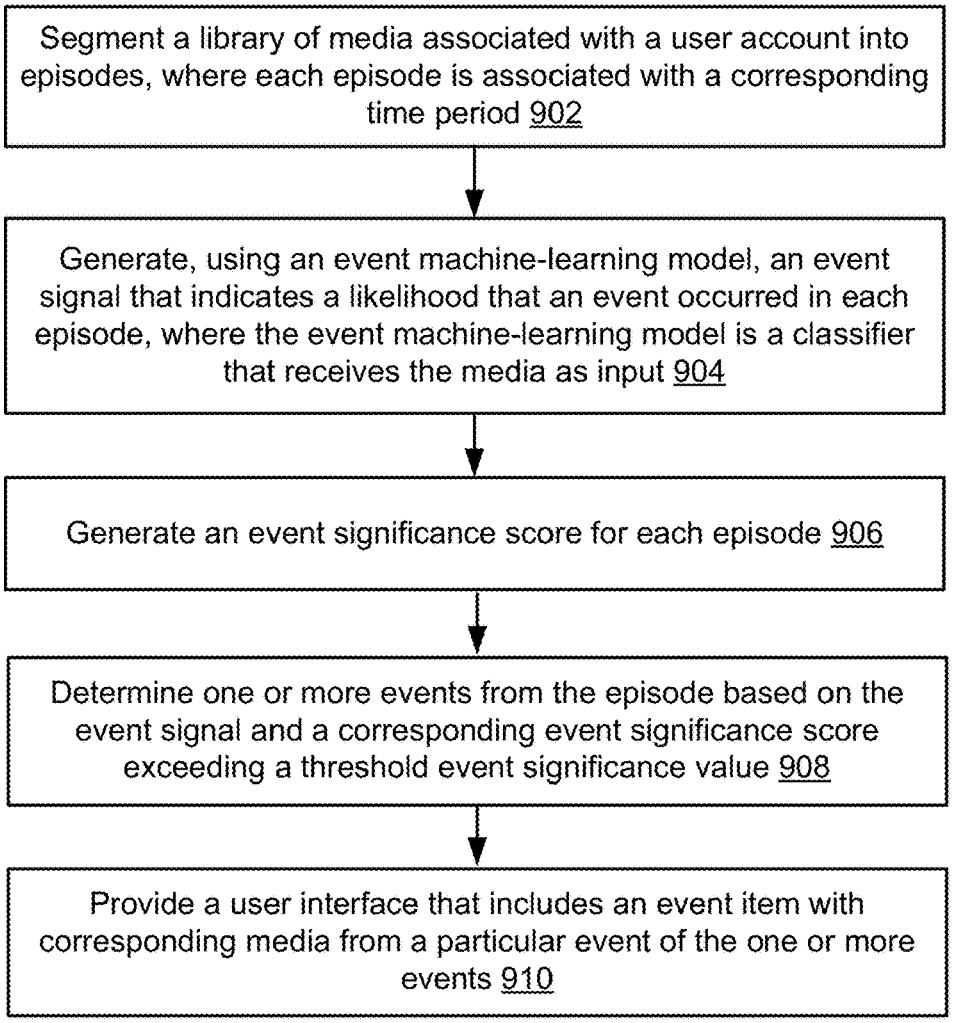
FIG. 9 is a flow diagram illustrating an example method for displaying an event item, according to some embodiments.

FIG. 9 is a flow diagram illustrating an example method 900 for displaying an event item, according to some embodiments. The method 900 may be performed by the computing device 200 in FIG. 2A or 2B, such as the user device 115 or the media server 101 illustrated in FIG. 1.

The method 900 may begin at block 902. In block 902, a library of media associated with a user account is segmented into episodes, where each episode is associated with a corresponding time period. Block 902 may be followed by block 904.

In block 904, an event machine-learning model generates an event signal that indicates a likelihood that an event occurred in each episode, where the event machine-learning model is a classifier that receives the media as input. Block 904 may be followed by block 906.

In block 906, an event significance score is generated for each episode. In some embodiments, the event significance score is based on one or more of at least a threshold number of media items in a corresponding episode, at least a threshold number of face clusters in the corresponding episode, a quality indicator of the media items in the corresponding episode, at least one face cluster of a threshold rank, or a presence of a rare face cluster. Block 906 may be followed by block 908.

In block 908, one or more events are determined from the episode based on the event signal and a corresponding event significance score exceeding a threshold event significance value. Block 908 may be followed by block 910.

In block 910, a user interface is provided that includes an event item with corresponding media from a particular event of the one or more events. In some embodiments, the user interface is part of a chronological grid of media that includes the corresponding media. If a user selects the event item from the chronological grid, the chronological grid may be replaced with a display of the corresponding media items from the particular event for a predetermined time duration and responsive to completing the display of the corresponding media items, the chronological grid is displayed.

Further to the descriptions above, a user may be provided with controls allowing the user to make an election as to both if and when systems, programs, or features described herein may enable collection of user information (e.g., information about a user's media items such as photos or videos; a user's social network; social actions or activities; profession; a user's preferences such as viewing preferences for image-based creations, settings for hiding people or pets, user interface preferences, etc.; or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method comprising:
segmenting a library of media associated with a user account into episodes, wherein each episode is associated with a corresponding time period;
generating, using an event machine-learning model, an event signal that indicates a likelihood that an event occurred in each episode, wherein the event machine-learning model is a classifier that receives the media as input;
generating an event significance score for each episode;
determining one or more events from the episodes based on the event signal and a corresponding event significance score exceeding a threshold event significance value;
providing a user interface that includes an event item with corresponding media from a particular event of the one or more events;
generating a confidence score that indicates a likelihood that a corresponding event is a type of event that is accurately recognized; and
responsive to the confidence score meeting a threshold confidence value, adding an automatically generated title descriptive of the type of event to the corresponding event.

2. The method of claim 1, wherein the user interface is part of a reverse-chronological grid of media that includes the corresponding media, and further comprising:
responsive to a user selecting the event item from the reverse-chronological grid, replacing the reverse-chronological grid with a display of the corresponding media from the particular event for a predetermined time duration; and
responsive to completing the display of the corresponding media, displaying the reverse-chronological grid.

3. The method of claim 1, wherein the event item is displayed with a size that is based on one or more of the event significance score, a number of media items for the particular event, a total number of events in a period of time, or an event type.

4. The method of claim 1, further comprising:
receiving a request from a user to remove depictions of a person from the media in the library of media that include depictions of the person; and
filtering the depictions of the person from the media, wherein the filtering is performed before the event significance score is generated.

5. The method of claim 1, wherein the user interface includes an option to hide or an option to add one or more of a media item from the one or more events, a date associated with the one or more events, or a person or pet depicted in media items from the one or more events.

6. The method of claim 1, wherein the user interface includes an option to hide the event item.

7. The method of claim 1, wherein generating the event significance score is based on one or more of at least a threshold number of media items in a corresponding episode, at least a threshold number of face clusters in the corresponding episode, a quality indicator of the media items in the corresponding episode, at least one face cluster of a threshold rank, or a presence of a rare face cluster.

8. The method of claim 1, further comprising combining multiple episodes into a single event based on one or more of the multiple episodes being associate with respective time periods that all fall within a 24-hour period, the single event being a type of event that occurs over multiple days, celebrations on different days that relate to the single event, the multiple episodes involving a same location, or the multiple episodes involving a same set of face clusters.

9. The method of claim 1, further comprising:
responsive to the confidence score failing to meet the threshold confidence value, adding a title to the corresponding event based on a template phrase.

10. The method of claim 1, wherein a title machine-learning model receives the corresponding media from the one or more events as input and the title machine-learning model generates a title as output.

11. The method of claim 1, wherein the user interface includes an option to edit the corresponding media from the particular event.

12. The method of claim 1, wherein determining the one or more events comprises determining events such that a number of the events is less than or equal to a predetermined number each month and further comprising:
receiving new media to associate with the library of media; and
replacing the particular event with a new event, responsive to the new event being associated with a new event significance score that is higher than the event significance score for the particular event.

13. The method of claim 1, wherein the user interface includes an option to change a title of the event item.

14. The method of claim 1, further comprising generating audio for the corresponding media that is based on a type of the particular event.

15. A computing device comprising:
a processor; and
a memory coupled to the processor, with instructions stored thereon that, when executed by the processor, cause the processor to perform operations comprising:
segmenting a library of media associated with a user account into episodes, wherein each episode is associated with a corresponding time period;
generating, using an event machine-learning model, an event signal that indicates a likelihood that an event occurred in each episode, wherein the event machine-learning model is a classifier that receives the media as input;
generating an event significance score for each episode;
determining one or more events from the episodes based on the event signal and a corresponding event significance score exceeding a threshold event significance value;
providing a user interface that includes an event item with corresponding media from a particular event of the one or more events, wherein the user interface is part of a reverse-chronological grid of media that includes the corresponding media;
responsive to a user selecting the event item from the reverse-chronological grid, replacing the reverse-chronological grid with a display of the corresponding media from the particular event for a predetermined time duration; and
responsive to completing the display of the corresponding media, displaying the reverse-chronological grid.

16. The computing device of claim 15, wherein the operations further comprise:
receiving a request from a user to remove depictions of a person from the media in the library of media that include depictions of the person; and
filtering the depictions of the person from the media, wherein the filtering is performed before the event significance score is generated.

17. The computing device of claim 15, wherein the event item is displayed with a size that is based on one or more of the event significance score, a number of media items for the particular event, a total number of events in a period of time, or an event type.

18. A non-transitory computer-readable medium with instructions stored thereon that, when executed by one or more computers, cause the one or more computers to perform operations, the operations comprising:
segmenting a library of media associated with a user account into episodes, wherein each episode is associated with a corresponding time period;
generating, using an event machine-learning model, an event signal that indicates a likelihood that an event occurred in each episode, wherein the event machine-learning model is a classifier that receives the media as input;
generating an event significance score for each episode;
determining events from the episodes based on the event signal and corresponding event significance scores exceeding a threshold event significance value such that a number of the events is less than or equal to a predetermined number each month;
providing a user interface that includes an event item with corresponding media from a particular event of the events;
receiving new media to associate with the library of media; and
replacing the particular event of the events with a new event, responsive to the new event being associated with a new event significance score that is higher than the event significance score for the particular event.

19. The computer-readable medium of claim 18, wherein the user interface is part of a reverse-chronological grid of media that includes the corresponding media and the operations further comprise:
responsive to a user selecting the event item from the reverse-chronological grid, replacing the reverse-chronological grid with a display of the corresponding media from the particular event for a predetermined time duration; and
responsive to completing the display of the corresponding media, displaying the reverse-chronological grid.

20. The computer-readable medium of claim 18, wherein the user interface includes an option to hide or an option to add one or more of a media item from one or more events, a date associated with the one or more events, or a person or pet depicted in media items from the one or more events.

* * * * *